US005548584A

United States Patent [19]
Beck et al.

[11] Patent Number: 5,548,584
[45] Date of Patent: Aug. 20, 1996

[54] TELEPHONE SWITCHING SYSTEM WITH SWITCHED LINE CIRCUITS

[75] Inventors: David S. Beck, Kanata; Bernard E. Bleuer, Nepean, both of Canada

[73] Assignee: Northern Telecom Limited, Montreal, Canada

[21] Appl. No.: 64,281

[22] Filed: May 20, 1993

[51] Int. Cl.$^6$ .................................................. H04Q 11/04
[52] U.S. Cl. ........................ 370/58.1; 370/110.1; 379/94
[58] Field of Search .............................. 370/110.1, 58.1, 370/65.5, 16, 85.2, 85.3, 95.1, 95.2, 95.3, 94.1, 58.2, 58.3; 379/93, 94, 96, 97, 98, 333, 383, 384, 377, 278, 272, 271, 378; 340/827; 371/8.1, 8.2, 11.1, 11.2; 395/181, 182.01

[56] References Cited

U.S. PATENT DOCUMENTS

| 4,112,260 | 9/1978 | Kurokawa | 379/333 |
|---|---|---|---|
| 4,571,721 | 2/1986 | Yasui et al. | 379/333 |
| 5,138,658 | 8/1992 | Carter et al. | 379/378 |
| 5,268,903 | 12/1993 | Jones et al. | 370/110.1 |
| 5,313,456 | 5/1994 | Sugawara | 370/16 |

*Primary Examiner*—Douglas W. Olms
*Assistant Examiner*—Dang Ton
*Attorney, Agent, or Firm*—George MacGregor; J. E. Moorhouse

[57] ABSTRACT

An analog switch matrix provides limited connectability between a plurality of n telephone line appearances and a lesser plurality of m line interface circuits each connected with a communication path in a telephone system. The analog switch matrix includes n groups of 3 crosspoints each being operable to connect and disconnect a one of the n telephone line appearances at any of 3 line interface circuits, each of which is connectable to more than three of the line appearances. A switch matrix controller directs switching operations of the analog switch matrix in response to transitions to OFF HOOK states having been sensed at line appearances and in concert with the call controller in the telephone switching system. In a telephone system with a concentration ratio of 4:1 the grade of service is maintained by performance of a call transfer between ones of line interface circuits at any time during a call progress.

21 Claims, 5 Drawing Sheets

| LINE APPEARANCE | CROSSPOINT NUMBER | CROSSPOINT NUMBER | CROSSPOINT NUMBER |
|---|---|---|---|
| | | | |
| | | | |
| | | | |
| | | | |
| | | | |
| | | | |
| | | | |

FIG. 7

| LINE INTERFACE CIRCUIT NUMBER | BUSY / IDLE STATUS |
|---|---|
| | |
| | |
| | |
| | |
| | |

FIG. 8

TELEPHONE SWITCHING SYSTEM WITH SWITCHED LINE CIRCUITS

The present invention is in the field of telephone systems and concerns apparatus and methods for coupling between the switching network in a telephone system and telephone lines served by the telephone system.

BACKGROUND OF THE INVENTION

Present day telephone systems usually include a switching network for providing communications paths between telephone lines served by the system. Such communications paths are provided under the direction of a call controller in response to signalling received from telephone lines. The communications paths are typically time defined as channels within periodically occurring frames and are usually referred to as time division multiplexed (TDM) channels. TDM channels are usually limited to digital transmission of binary signals across the switching network. Voice communications may be carried on via the TDM channels in the well known pulse code modulated (PCM) signal format. Hence many present day telephone systems are referred to as TDM PCM telephone systems.

Most present day telephone lines are analog in nature, being operable in a signal format within a voice band of frequencies. However, some telephone lines operate in adherence with the recommended integrated services digital network (ISDN) standard signal format. The ISDN signal format requires an operating frequency spectrum which extends many octaves beyond the voice band. Yet other telephone lines operate in proprietary signal formats in association with private branch exchanges (PBXs) and the like. In any case, none of the signal formats of operating telephone lines is likely to be compatible with the digital signal operating format of the typical time division multiplex telephone switching facility. Hence for at least each telephone line in active service, there is provided a line interface circuit which exchanges signals between the active telephone line and a digital signals communications path provided by the digital switching network. The line circuit functions to provide all or most of the interface functions required in order that the switching facility provide telephone service for the telephone line. These functions typically include:

supplying direct current for energizing the telephone line and an associated telephone instrument, performing two wire to four wire signal conversions, and usually, converting digital signals, received from the digital signals communications path, to analog signals for receipt by the associated telephone instrument, converting analog signals, originating at the associated telephone instrument, to digital signals for transmission via the digital signals communications path, coupling of the transmit signal to and the receive signal from a time defined channel in a TDM signal stream having been designated as the digital signals communications path in the switching network, and sensing signalling such as for ON HOOK and OFF HOOK states of the telephone line.

One important function of the practical line interface circuit, in cooperation with various protection devices, is that of isolating the switching network, which is somewhat delicate, from transient and potentially catastrophic electrical events to which a telephone line can be exposed, events such as lightning strikes and powerline crosses.

As is well known, the grade or quality of service that any telephone system may provide is related to the peak traffic the system must handle in relation to n telephone line connections or appearances at the switching network. In North America, as a matter of cost, it is considered preferable to concentrate n telephone lines upon m accessible channels in the switching network, where n is in a range of between about 2 m and 6 m. This four to one concentration ratio is based on the statistical fact that in most telephone exchanges very seldom are there as many as ¼ of the telephones in use at any one time. Coupling the n telephone lines with the m channels is typically achieved in either of two ways.

In one example, each line interface circuit of a group of 24 line interface circuits is connected to operate with one of 24 TDM channels. A switch (n×m) matrix is provided to connect up to 24 of as many as 96 or so telephone lines to the 24 TDM channels. As it is rare that more than 24 of the telephone lines in the group will be in an active (OFF HOOK) state at any one time, telephone service is effectively always available to any one of the telephone lines at any time.

In another example, each of up to 120 or so telephone lines is each terminated at a preassigned one of n line interface circuits. Each of the n line interface circuits has common access to m channels such that up to 30 of the telephone lines may be switched to any of the 30 channels at any time, for the duration of a telephone call. As in the first example, this provides a concentration of about 4 to 1. As it is rare that more than 30 of the telephone lines in the group will be in an active (OFF HOOK) state at any one time, telephone service is effectively always available to any one of the telephone lines at any time.

In the first example, economy is achieved in that only m line interface circuits are required to serve four times as many lines. However, this is at the expense of having to provide the analog switch (n×m) matrix. In the second example, the cost of the analog (n×m) switch matrix is avoided, but at the expense of having to provide n line interface circuits, that is, one in connection with each of the n telephone lines. In typical telephone digital switching systems, the provision of adequate line interfacing apparatus is a major expense.

It is an object of the invention to reduce the cost and complexity of a switch matrix for interconnecting analog telephone lines with line interface circuits.

It is also an object of the invention to provide a method for controlling the switch matrix such that very little, if any, consequent reduction in service availability is experienced by users of a telephone system wherein the switch matrix is used.

SUMMARY OF THE INVENTION

In accordance with the invention, a line interface system for coupling a plurality of line terminals to a lesser plurality of communications paths in a telephone system, comprises line interface circuits, each of which is capable of coupling signals between one communications path in the telephone system and a one of the line terminals. Detection circuits are each connected with a corresponding one of the line terminals. Each detection circuit is for detecting a transition from an idle state to an active state of an associated telephone line, connected at a line terminal. An analog switch means is operable to selectively connect any one of the line terminals to any one of a predetermined plurality of the line interface circuits wherein said predetermined plurality is limited to a number of less than all of the line interface circuits.

Stated in other terms, a line interface system for coupling a plurality of n telephone line appearances to a lesser plurality of m communications paths in a telephone system, the line interface system comprises:

m line interface circuits, each of which provides signal translation between an operating signal format of a preassigned one of the m communications paths in the telephone system and a one of the telephone line appearances;

a sensing circuit means connected with each of the telephone line appearances, each sensing circuit means for sensing ON HOOK and OFF HOOK states of a telephone line;

analog switch means including n groups of z crosspoints each of the z crosspoints in a group being operable to connect and disconnect a one of the n telephone line appearances at a corresponding one of the m line interface circuits, the n groups of z crosspoints being so arranged that each of the m line interface circuits is connectable with more than z of the line appearances, and control means for directing switching operations of the analog switch means to connect a telephone line appearance with a corresponding idle one of the line interface circuits via the associated crosspoint, in response to a transition to an OFF HOOK state having been sensed by the sensing circuit means.

In one example, a typical telecommunications switching system includes a plurality of line interface circuits for coupling communications signals between channels in a switching network and line terminals for connection of telephone lines served by the telecommunications switching system, and a call control means being responsive to signalling received from the telephone lines in association with telephone calls, for directing the operations of a switching network to provide communications paths between ones of the telephone lines, the telecommunications switching system. In accordance with the invention, the telecommunications switching system comprises means for coupling each of the line interface circuits with a predetermined one of the channels in the switching network. A detector means is connected at each of a plurality of the line terminals for detecting a transition from an ON HOOK state to an OFF HOOK state. An analog switch means is controllable for connecting each of the telephone lines in the plurality of telephone lines to any one of a limited number of not more than a predetermined half of the line interface circuits, in the plurality of line interface circuits. A control means is responsive to a detected transition to the OFF HOOK state, at any of the line terminals, for causing the analog switch means to switch said one telephone line to an idle one of said predetermined line interface circuits, and, in an event of none of said predetermined line interface circuits being idle, the control means being responsive to the detected transition, for causing the analog switch means to re-switch another telephone line, already having been connected to one of said predetermined line interface circuits, to being connected to an alternate line interface circuit not within said limited number of line interface circuits, and disconnecting said another telephone line from the one line interface circuit, and thereafter for causing the analog switch means to connect said one telephone line with the idled one line interface circuit.

A method in accordance with the invention provides for coupling a plurality of up to m telephone calls from among n telephone line appearances, to a plurality of m communications paths in a telephone system, and comprises the steps of:

providing connectability between each of the n telephone line appearances and less than all the m communication paths, such that any one of the m communications paths is connectable with any of at least a plurality of the n telephone line appearances; and in an event of a service request occurring at a one of the n telephone line appearances for which all of the connectable communications paths are already engaged by others of the n telephone line appearances, and in the event that there is an alternately engageable communications path available to one of said others of the n telephone line appearances, transferring the one of said others of the n telephone line appearances to be engaged with the alternate communications path, and thereafter engaging said one telephone line appearance with the communications path from which the one of said others of the n telephone line appearances is transferred.

INTRODUCTION OF THE DRAWINGS

An example embodiment is discussed with reference to the accompanying drawings in which.

DESCRIPTION OF THE PREFERRED EMBODIMENTS

Figure 1:
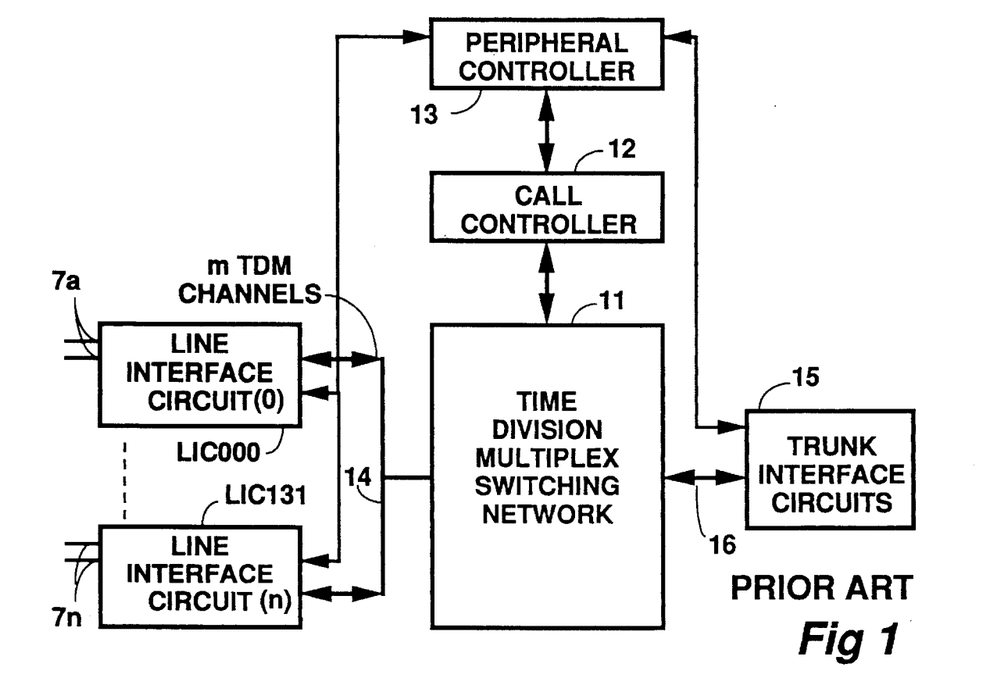
FIG. 1 is a block diagram of a typical digital telephone switching system, exemplary of prior art.

The telephone system in FIG. 1 is one example of the general form of known time division telephone systems. This telephone system is characterized by a time division multiplex switching network 11 which operates under the direction of a call controller 12 to provide communications paths, not shown, between ones of m TDM channels appearing via a TDM loop 14 and ones of m TDM channels appearing via a TDM loop 16. Trunk interface circuits 15 couple up to m trunks or trunk channels, not shown, with the m TDM channels appearing on the TDM loop 16, under the direction of a peripheral controller 13 which functions in concert with the call controller 12. In a practical example there are many of the TDM loops 14 and several TDM loops 16. The channels m provided via a TDM loop 14 to a group of line interface circuits are usually either 24 or 32 in number, depending upon the design of the telephone system. In association with a 32 channel TDM loop, each of as many as 132 telephone lines, 7a through 7n, is connected to a corresponding individual line interface circuit, LIC000–LIC131. Line interface circuits as disclosed by any of U.S. Pat. No. 4,103,112 issued 25 Jul. 1978 entitled "Telephone Line Circuit with Differential Loop Current Sensing and Compensation" to V. V. Korsky; U.S. Pat. No.

4,232,293 issued 4 Nov. 1980 entitled "Line Interface Unit for Voice and Wideband Signal Coupling" to H. Harris; and U.S. Pat. No. 4,514,595 issued 30 Apr. 1985 entitled "Active Impedance Line Feed Circuit" to S. Rosenbaum et al and numerous others may be appropriate. Each of the line interface circuits is connected to have selective access to one of the m TDM channels as directed by the peripheral controller 13 and the call controller 12 acting in concert during the normal progress of a telephone call.

Figure 2:
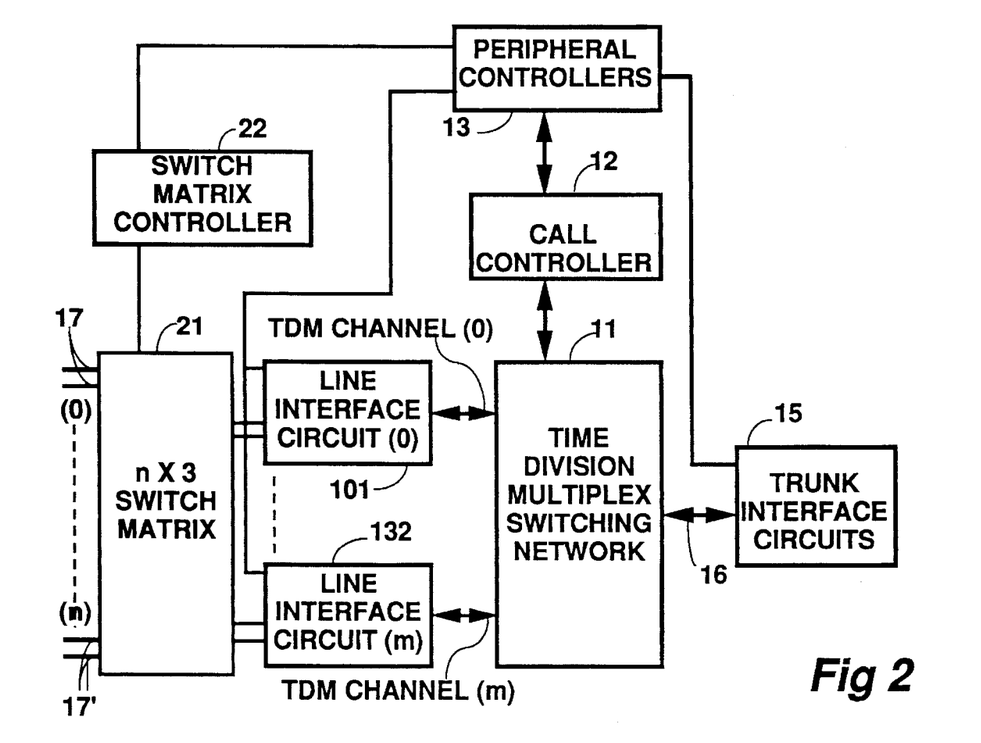
FIG. 2 is a block diagram of a telephone switching system in accordance with the invention.
Figure 7:
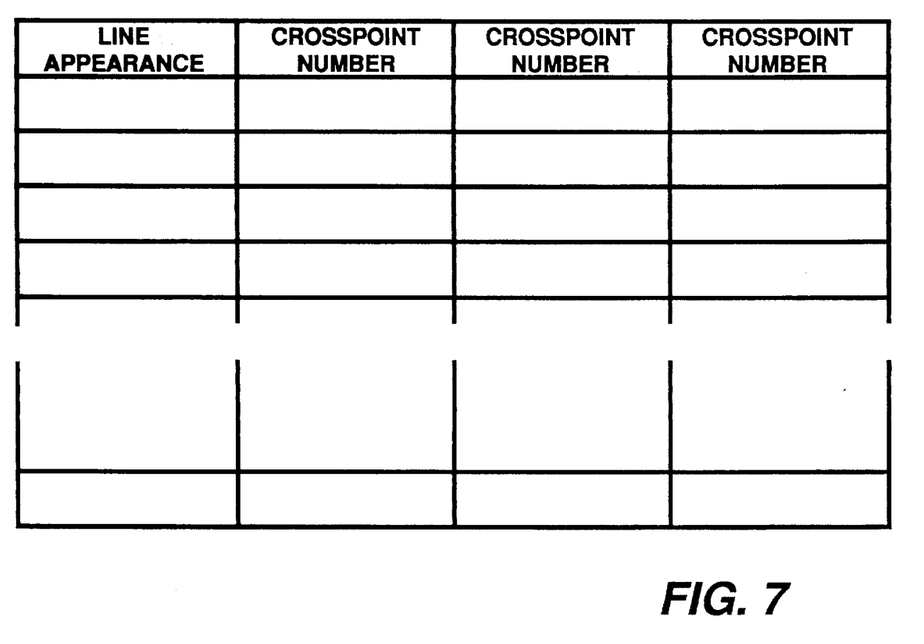
FIG. 7 is a diagram of the organization of a configuration memory used in the telephone system illustrated in FIG. 2.
Figure 8:
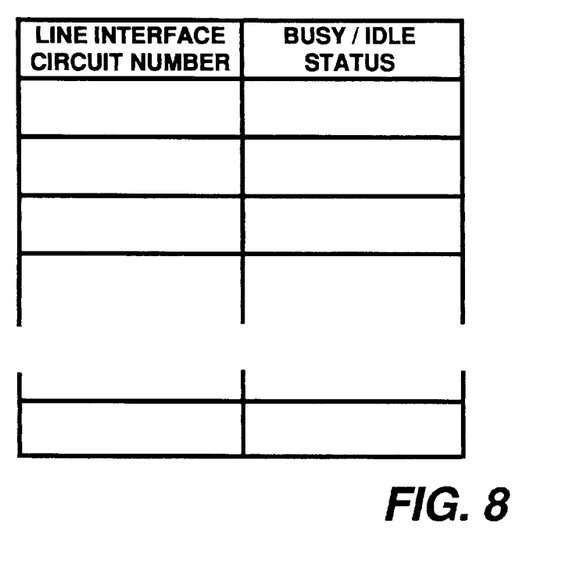
FIG. 8 is a diagram of the organization of a busy/idle memory map used in the telephone system illustrated in FIG. 2.

In FIG. 2, a typical telephone system is modified by the inclusion of an n×3 switch matrix 21, whereby the number of line interface circuits required is limited to the number m of the TDM channels available for telephone calls for as many as n telephone lines 17 through 17'. For convenience of description, those parts of the telephone system in FIG. 2, that are similar to the parts of the telephone system in FIG. 1, are identified with similar labels. Line interface circuits 101 through 132 are each permanently assigned to a corresponding channel in a frame of channels in a TDM switching network 11. A call controller 12, a peripheral controller 13 and a switch matrix controller 22, act in concert to provide telephone communications via the n×3 switch matrix 21 selected ones of the line interface circuits 101–132 and selected channels in the TDM switching network 11. FIGS. 7 and 8 illustrate memory structures used within the switch matrix controller 22. The memory structure in FIG. 7 is normally used as a read only memory wherein wired relationships between line appearances and crosspoints in the switch matrix are stored. The memory structure in FIG. 8 is normally used as a random access memory which is both read and written to keep a record of the activity of each of the line interface circuits connected between the switch matrix 21 and the switching network 11.

Figures 3, 4:
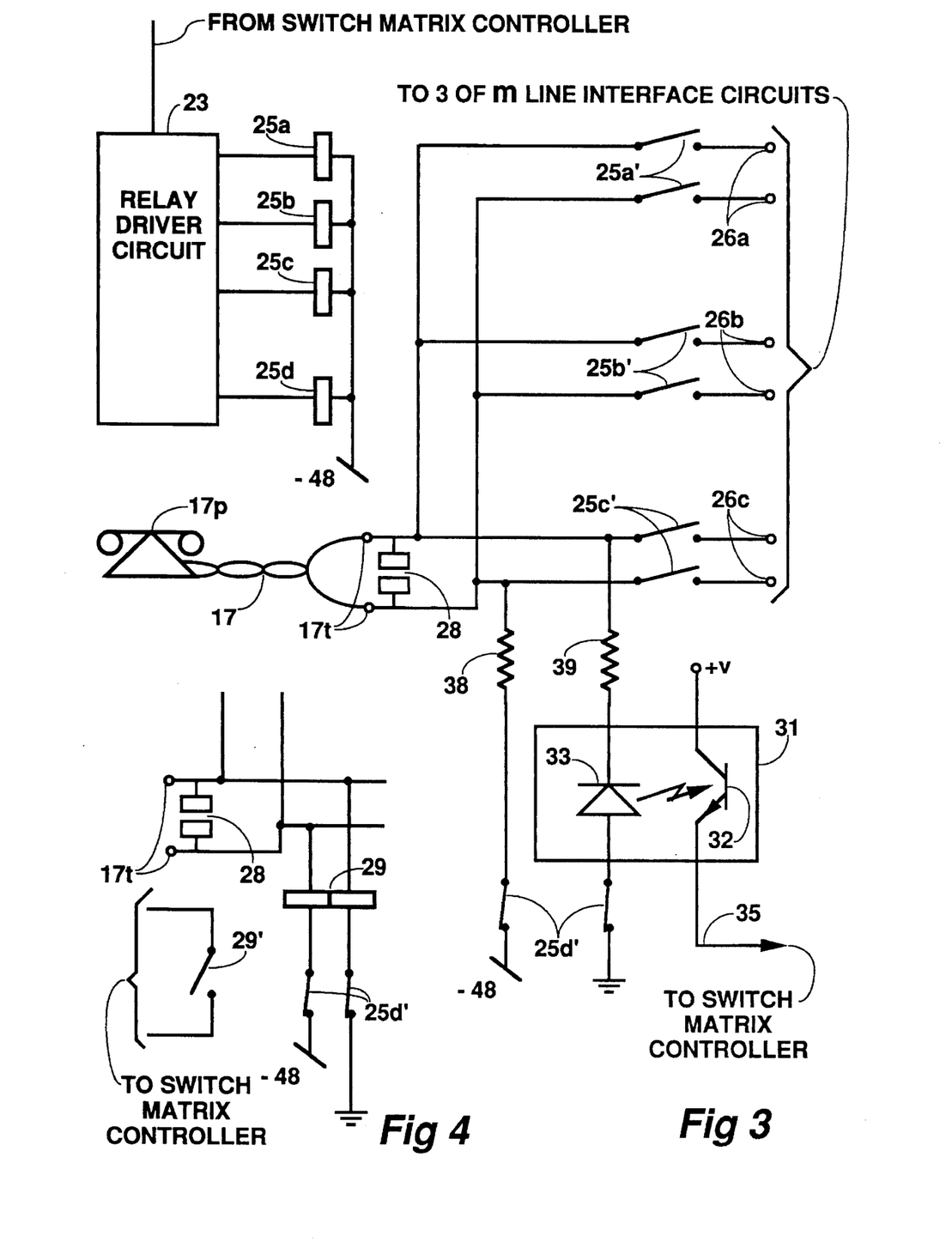
FIG. 3 is a block schematic diagram of part of a switch matrix used in the telephone switching system illustrated in FIG. 2, in accordance with the invention.
FIG. 4 is an alternate example of sensing circuitry which may be used in the switch matrix illustrated in FIG. 3.

An example of part of an electromechanical analog switch matrix which may be used to provide the switch matrix 21, is partially illustrated in FIG. 3. In FIG. 3, a telephone instrument 17p is shown as being connected at a telephone line appearance consisting of a pair of line terminals 17t, via a telephone line consisting of a twisted pair of tip and ring conductors 17. A protection device 28 is connected across the line terminals 17e, to reduce effects of transient electrical events such as lightning strikes upon the telephone line 17. Relays 25a, 25b, 25c, and 25d are connected to be selectively operable by a relay driver circuit 22, which is responsive to control signals from the switch matrix controller 21, in FIG. 2, for this purpose. The line terminals 17t are associated with predetermined three line interface circuits of the group of line interface circuits 101–132 via the relays 25a, 25b and 25c, and pairs of terminals 26a, 26b, and 26c. Hence the tip and ring leads of the telephone line 17, as shown in FIG. 3, may be extended to any pair of terminals 26a, 26b, and 26c, by operation of a corresponding crosspoint, in this example, pairs of relay make contacts 25a', 25b', and 25c', associated with the relays 25a, 25b, and 25c, respectively. Determination of OFF HOOK and ON HOOK states of the telephone instrument 17p are detected by a sensing circuit 31, in this case an optical coupler, which includes a photo transistor connected in series between a source of voltage +V and the switch matrix controller 21, in FIG. 2, via a lead 35. As shown in FIG. 3, a light emitting diode 33 is connectable to conduct current between ground and a −48 volt central battery via normally closed contacts 25d', associated with the relay 25d, resistors 38 and 39 and the telephone line 17, when the telephone instrument 17p is OFF HOOK. The sensing circuit 31 may be disconnected from the telephone by operation of the relay 25d and its associated relay contacts 25d'. As exemplified in FIG. 4, the sensing function may also be performed by a relay 29 having two coils and an associated contact 29', the coils being connectable in series with the tip and ring leads of the telephone line and power via the relay contacts 25d'.

Other exemplary structures for providing the switch matrix 22 will come to mind to one skilled in solid state circuits useful in the range of voltages typical of analog telephony. For example, it is envisaged that active line feed resistors as disclosed in U.S. Pat. No. 5,189,697 issued to T. K. Das et al on Feb. 23, 1993, may be modified to introduce a logical switching function in addition to the disclosed isolation switching response to telephone line overvoltages, to provide the crosspoints for the switch matrix.

An example of an interconnection pattern in a switch matrix for interconnecting up to 100 telephone line appearances with 32 communications paths is given in table 1.

TABLE 1

| LINE | FIRST CIRCUIT | SECOND CIRCUIT | THIRD CIRCUIT |
|------|---------------|----------------|---------------|
| 00 | 00 | 01 | 05 |
| 01 | 01 | 02 | 06 |
| 02 | 02 | 03 | 07 |
| 03 | 03 | 04 | 08 |
| 04 | 04 | 05 | 09 |
| 05 | 05 | 06 | 10 |
| 06 | 06 | 07 | 11 |
| 07 | 07 | 08 | 12 |
| 08 | 08 | 09 | 13 |
| 09 | 09 | 10 | 14 |
| 10 | 10 | 11 | 15 |
| 11 | 11 | 12 | 16 |
| 12 | 12 | 13 | 17 |
| 13 | 13 | 14 | 18 |
| 14 | 14 | 15 | 19 |
| 15 | 15 | 16 | 20 |
| 16 | 16 | 17 | 21 |
| 17 | 17 | 18 | 22 |
| 18 | 18 | 19 | 23 |
| 19 | 19 | 20 | 24 |
| 20 | 20 | 21 | 25 |
| 21 | 21 | 22 | 26 |
| 22 | 22 | 23 | 27 |
| 23 | 23 | 24 | 28 |
| 24 | 24 | 25 | 29 |
| 25 | 25 | 26 | 30 |
| 26 | 26 | 27 | 31 |
| 27 | 27 | 28 | 00 |
| 28 | 28 | 29 | 01 |
| 29 | 29 | 30 | 02 |
| 30 | 30 | 31 | 03 |
| 31 | 31 | 00 | 04 |
| 32 | 00 | 01 | 05 |
| 33 | 01 | 02 | 06 |
| 34 | 02 | 04 | 10 |
| 35 | 03 | 05 | 11 |
| 36 | 04 | 06 | 12 |
| 37 | 05 | 07 | 13 |
| 38 | 06 | 08 | 14 |
| 39 | 07 | 09 | 15 |
| 40 | 08 | 10 | 16 |
| 41 | 09 | 11 | 17 |
| 42 | 10 | 12 | 18 |
| 43 | 11 | 13 | 19 |
| 44 | 12 | 14 | 20 |
| 45 | 13 | 15 | 21 |
| 46 | 14 | 16 | 22 |
| 47 | 15 | 17 | 23 |
| 48 | 16 | 18 | 24 |
| 49 | 17 | 19 | 25 |
| 50 | 18 | 20 | 26 |
| 51 | 19 | 21 | 27 |
| 52 | 20 | 22 | 28 |
| 53 | 21 | 23 | 29 |
| 54 | 22 | 24 | 30 |
| 55 | 23 | 25 | 31 |
| 56 | 24 | 26 | 00 |
| 57 | 25 | 27 | 01 |
| 58 | 26 | 28 | 02 |
| 59 | 27 | 29 | 03 |
| 60 | 28 | 30 | 04 |
| 61 | 29 | 31 | 05 |

TABLE 1-continued

| LINE | FIRST CIRCUIT | SECOND CIRCUIT | THIRD CIRCUIT |
| --- | --- | --- | --- |
| 62 | 30 | 00 | 06 |
| 63 | 31 | 01 | 07 |
| 64 | 00 | 02 | 08 |
| 65 | 01 | 03 | 09 |
| 66 | 02 | 04 | 10 |
| 67 | 03 | 06 | 11 |
| 68 | 04 | 07 | 14 |
| 69 | 05 | 08 | 15 |
| 70 | 06 | 09 | 16 |
| 71 | 07 | 10 | 17 |
| 72 | 08 | 11 | 18 |
| 73 | 09 | 12 | 19 |
| 74 | 10 | 13 | 20 |
| 75 | 11 | 14 | 21 |
| 76 | 12 | 15 | 22 |
| 77 | 13 | 16 | 23 |
| 78 | 14 | 17 | 24 |
| 79 | 15 | 18 | 25 |
| 80 | 16 | 19 | 26 |
| 81 | 17 | 20 | 27 |
| 82 | 18 | 21 | 28 |
| 83 | 19 | 22 | 29 |
| 84 | 20 | 23 | 30 |
| 85 | 21 | 24 | 31 |
| 86 | 22 | 25 | 00 |
| 87 | 23 | 26 | 01 |
| 88 | 24 | 27 | 02 |
| 89 | 25 | 28 | 03 |
| 90 | 26 | 29 | 04 |
| 91 | 27 | 30 | 05 |
| 92 | 28 | 31 | 06 |
| 93 | 29 | 00 | 07 |
| 94 | 30 | 01 | 08 |
| 95 | 31 | 02 | 09 |
| 96 | 00 | 03 | 10 |
| 97 | 01 | 04 | 11 |
| 98 | 02 | 05 | 12 |
| 99 | 03 | 06 | 17 |

In accordance with Table 1, the switch matrix 22 includes 100 groups of 3 crosspoints each, for a total of 300 crosspoints. Each crosspoint is operable to connect and disconnect a one of 100 telephone line appearances at a corresponding one of 3 communications paths. It should be noted that connectivity of any one communications path is shared between more than 3 of the line appearances but restricted to far less than all the line appearances.

Table 2 illustrates an example of an interconnection pattern in a switch matrix for interconnecting up to 96 line appearances with 24 communications paths.

TABLE 2

| LINE | FIRST CIRCUIT | SECOND CIRCUIT | THIRD CIRCUIT |
| --- | --- | --- | --- |
| 1 | 1 | 2 | 6 |
| 2 | 2 | 3 | 7 |
| 3 | 3 | 4 | 8 |
| 4 | 4 | 5 | 9 |
| 5 | 5 | 6 | 10 |
| 6 | 6 | 7 | 11 |
| 7 | 7 | 8 | 12 |
| 8 | 8 | 9 | 13 |
| 9 | 9 | 10 | 14 |
| 10 | 10 | 11 | 15 |
| 11 | 11 | 12 | 16 |
| 12 | 12 | 13 | 17 |
| 13 | 13 | 14 | 18 |
| 14 | 14 | 15 | 19 |
| 15 | 15 | 16 | 20 |
| 16 | 16 | 17 | 21 |

TABLE 2-continued

| LINE | FIRST CIRCUIT | SECOND CIRCUIT | THIRD CIRCUIT |
| --- | --- | --- | --- |
| 17 | 17 | 18 | 22 |
| 18 | 18 | 19 | 23 |
| 19 | 19 | 20 | 24 |
| 20 | 20 | 21 | 2 |
| 21 | 21 | 22 | 3 |
| 22 | 22 | 23 | 4 |
| 23 | 23 | 24 | 5 |
| 24 | 24 | 1 | 6 |
| 25 | 1 | 3 | 8 |
| 26 | 2 | 4 | 9 |
| 27 | 3 | 5 | 10 |
| 28 | 4 | 6 | 11 |
| 29 | 5 | 7 | 12 |
| 30 | 6 | 8 | 13 |
| 31 | 7 | 9 | 14 |
| 32 | 8 | 10 | 15 |
| 33 | 9 | 11 | 16 |
| 34 | 10 | 12 | 17 |
| 35 | 11 | 13 | 18 |
| 36 | 12 | 14 | 19 |
| 37 | 13 | 15 | 20 |
| 38 | 14 | 16 | 21 |
| 39 | 15 | 17 | 22 |
| 40 | 16 | 18 | 23 |
| 41 | 17 | 19 | 24 |
| 42 | 18 | 20 | 1 |
| 43 | 19 | 21 | 3 |
| 44 | 20 | 22 | 4 |
| 45 | 21 | 23 | 5 |
| 46 | 22 | 24 | 6 |
| 47 | 23 | 1 | 7 |
| 48 | 24 | 2 | 8 |
| 49 | 1 | 4 | 9 |
| 50 | 2 | 5 | 10 |
| 51 | 3 | 6 | 11 |
| 52 | 4 | 7 | 12 |
| 53 | 5 | 8 | 13 |
| 54 | 6 | 9 | 14 |
| 55 | 7 | 10 | 15 |
| 56 | 8 | 11 | 16 |
| 57 | 9 | 12 | 17 |
| 58 | 10 | 13 | 18 |
| 59 | 11 | 14 | 19 |
| 60 | 12 | 15 | 20 |
| 61 | 13 | 16 | 21 |
| 62 | 14 | 17 | 22 |
| 63 | 15 | 18 | 23 |
| 64 | 16 | 19 | 24 |
| 65 | 17 | 20 | 1 |
| 66 | 18 | 21 | 4 |
| 67 | 19 | 22 | 5 |
| 68 | 20 | 23 | 6 |
| 69 | 21 | 24 | 7 |
| 70 | 22 | 1 | 8 |
| 71 | 23 | 2 | 9 |
| 72 | 24 | 3 | 10 |
| 73 | 1 | 5 | 11 |
| 74 | 2 | 6 | 12 |
| 75 | 3 | 7 | 13 |
| 76 | 4 | 8 | 14 |
| 77 | 5 | 9 | 15 |
| 78 | 6 | 10 | 16 |
| 79 | 7 | 11 | 17 |
| 80 | 8 | 12 | 18 |
| 81 | 9 | 13 | 19 |
| 82 | 10 | 14 | 20 |
| 83 | 11 | 15 | 21 |
| 84 | 12 | 16 | 22 |
| 85 | 13 | 17 | 23 |
| 86 | 14 | 18 | 24 |
| 87 | 15 | 19 | 1 |
| 88 | 16 | 20 | 2 |
| 89 | 17 | 21 | 3 |
| 90 | 18 | 22 | 4 |
| 91 | 19 | 23 | 5 |
| 92 | 20 | 24 | 6 |

TABLE 2-continued

| LINE | FIRST CIRCUIT | SECOND CIRCUIT | THIRD CIRCUIT |
|---|---|---|---|
| 93 | 21 | 1 | 8 |
| 94 | 22 | 2 | 9 |
| 95 | 23 | 3 | 10 |
| 96 | 24 | 4 | 11 |

Table 3 illustrates an example of an interconnection pattern in a switch matrix for interconnecting up to 12 telephone line appearances with 6 communications paths.

TABLE 3

| LINE | FIRST CIRCUIT | SECOND CIRCUIT | THIRD CIRCUIT |
|---|---|---|---|
| 1 | 1 | 2 | 4 |
| 2 | 2 | 3 | 5 |
| 3 | 3 | 4 | 6 |
| 4 | 4 | 5 | 1 |
| 5 | 5 | 6 | 2 |
| 6 | 6 | 1 | 3 |
| 7 | 1 | 3 | 4 |
| 8 | 2 | 4 | 5 |
| 9 | 3 | 5 | 6 |
| 10 | 4 | 6 | 1 |
| 11 | 5 | 1 | 2 |
| 12 | 6 | 2 | 3 |

Figure 5:
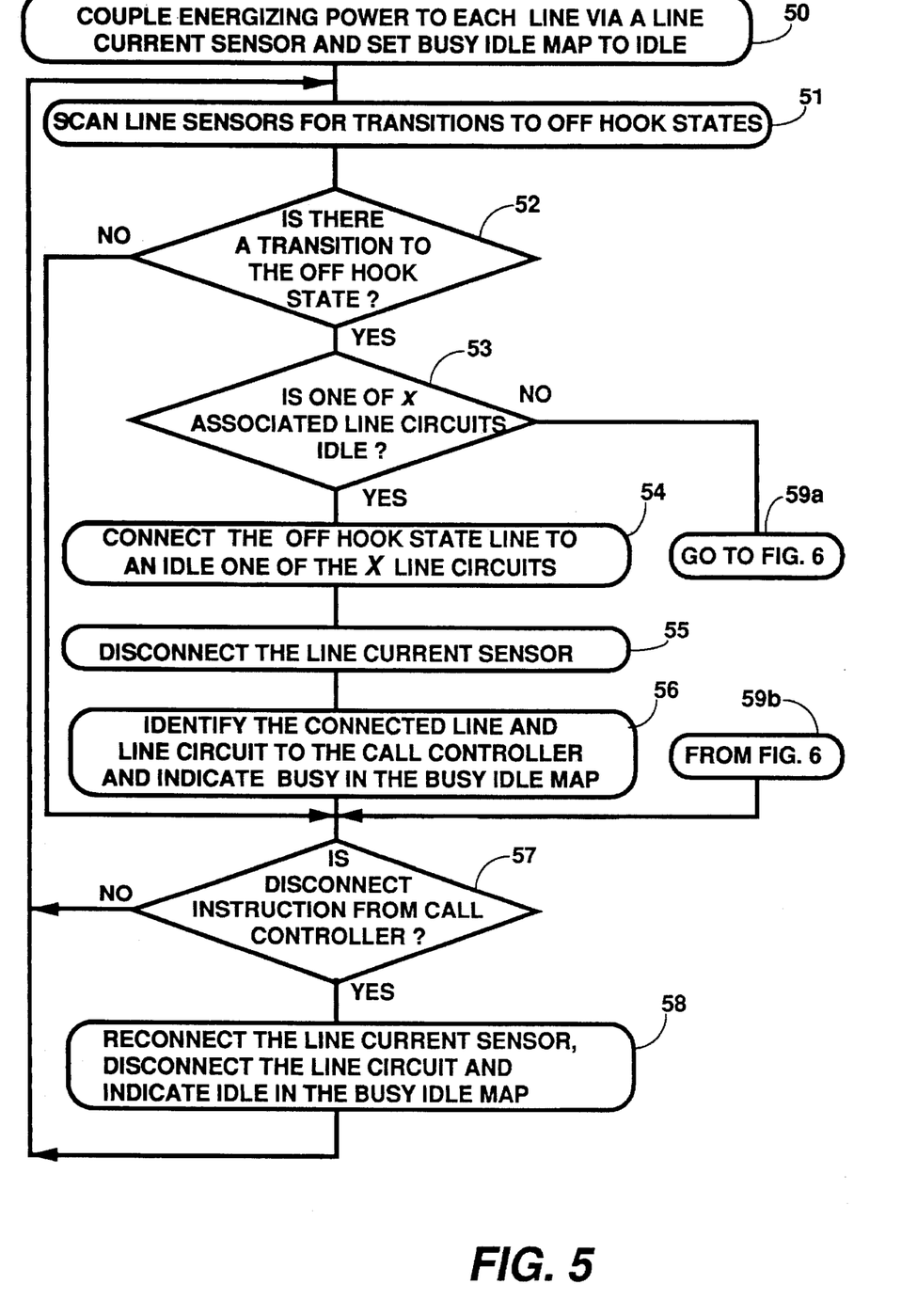
FIGS. 5 and 6 are flow diagrams representative of a method of operating the telephone switching system illustrated in FIGS. 2 and 3, in accordance with the invention.
Figure 6:
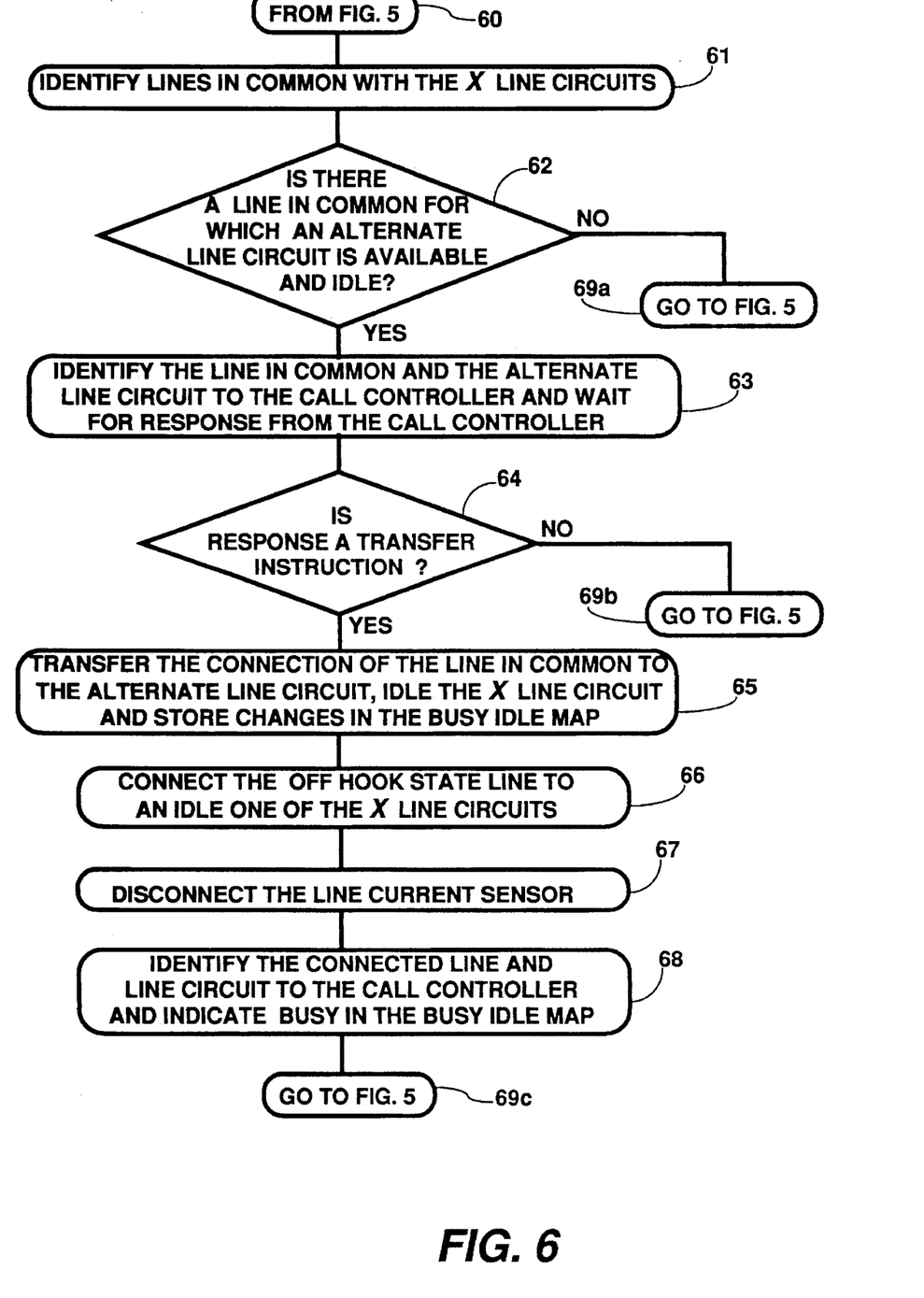

FIGS. 5 and 6 illustrate a method for operating the switch matrix 22 in a telephone system as hereinbefore described in conjunction with the preceding figures. As shown in a function box 50, upon system initialization, energizing power is supplied to each of the telephone line appearances via the line current sensing circuit 31 and the busy idle map (FIG. 8) in the switch matrix controller 21 is set to idle. The switch matrix controller 21 scans each of leads 35 for an indication of a transition to an OFF HOOK state at one of the telephone line appearances, as indicated in a function box 51. As required by a decision box 52, if an OFF HOOK state is indicated, the switch matrix controller 21 determines if one of the line circuits that is defined in the connection memory (FIG. 7) as being connectable with the OFF HOOK state line is idle. If yes, the telephone line is connected via the switch matrix 21 and via the formerly idle line circuit at the associated communications paths in the TDM is switching network 11, as indicated in a function box 54. As the signalling and supervision functions are now provided for by the line interface circuit, the switch matrix controller 21 causes the line current sensing circuit 31 to be disconnected, as shown in a function box 55. At the same moment the switch matrix controller 21 identifies the connected line and line interface circuit for the call controller 12, as shown in a function box 56, so that a typical call progress may follow, and updates its busy idle map.

When a call has progressed to a conclusion, the communications path having been provided by the telephone system is idled and likewise the associated line interface circuit is also required to be idled. As required in decision box 57, the switch matrix controller 21 checks to determine if a disconnect instruction has been issued from the call controller 12. If so, it causes the line current sensing circuit 31 to be reconnected, and the associated line interface circuit to be disconnected, while updating the busy idle map. Thereafter the switch matrix controller 21 resumes the scanning of the line sensors as indicated in the function box 51, and as would be the case in the event that no disconnect instruction has been issued from the call controller 12. Returning to consider the decision box 52, in the event that no OFF HOOK transitions had occurred at any one of the telephone line appearances, the switch matrix controller 21 immediately checks for a disconnect instruction as indicated in the decision box 57.

As will be appreciated in order that an acceptable standard of telephone service be provided, it is essential that the method make provision for a demand for service occurrence at a moment when all the line interface circuits, to which the telephone line appearance may be connected, are already busy. In such a situation, the method as will be described is almost always able to provide the demanded service. Referring again to the decision box 53, if none of the associated line interface circuits is free to provide service, reference to FIG. 6 is required as indicated in a function box 59a.

In FIG. 6, a method is illustrated which includes dynamic reswitching of line appearances and associated line interface circuits whereby an acceptable grade of telephone service may be maintained. The flow diagram in FIG. 6 is entered from FIG. 5, as indicated at a function box 60 and in a function box 61, and illustrates that the switch matrix controller 22 identifies those line appearances associated with line interface circuits in common with line circuits associated with the demand for service. Thereafter, as indicated in a decision box 62, it is determined if there is an alternate path which is idle by which any one of the line appearances in common may be connected. Experience has show that it is an unusual event, in an embodiment as exemplified in table 1, that an alternate line interface circuit is unavailable. However, if such is the case, the switch matrix controller 22 immediately looks for a disconnect instruction from the call controller 12 whereafter it eventually returns to the scanning function indicated in the function box 51. The scanning function is limited to resuming at a line appearance following the last line appearance having been scanned and hence the unserviced demand for service is simply ignored until the unserviced line appearance is again scanned while in the OFF HOOK state.

Assuming that, as is usual, there is an alternate path by which a call in progress may be switched, the identities of the line appearance and that of the alternate line interface circuit are made available to the call controller 12. As shown in a function box 63, if a response from the call controller 12 indicates a call transfer is denied, the process reverts to looking for a disconnect instruction via function box 69b. As before, the demand for service from the line appearance is simply ignored. However, this is not usually the case. Usually a call transfer is indicated and, as indicated in a function box 65, the switch matrix controller 22 causes the connection of the line in common to be transferred to the alternate line interface circuit, and the originally occupied line interface circuit to be rendered idle. These changes are made of record in the busy idle map. Thereafter, as indicated in a function box 66, the line appearance with the demand for service is connected via the one of its three associated relays to the now available line interface circuit. The line current sensing circuit is disconnected as indicated in a function box 67, so that it will not interfere with the normal functions of signalling, supervision and line feed provided by the line interface circuit. As shown in a function box 68, the switch matrix controller 22 identifies the connected line and the line interface for the call controller 12 and, of course, indicates busy in relation to these elements in the busy idle map. Following this, the switch matrix controller 22 resumes the more routine process as illustrated in FIG. 5, as indicated in a function box 69c.

The invention hereinbefore disclosed has been described in terms of functions relating to the origination of a call progress by a calling party served via one of the n telephone line appearances. However, it will be readily understood by those familiar with the structures and operations of telephone systems in general that in practical applications of the invention, the switch matrix controller will be made to be responsive to the connection requests from the call controller by indicting at which line interface circuit any particular called party served by one of the n telephone line appearances will be connected via the switch matrix.

It is expected that various telephone switching systems wherein a reduced crosspoint switching matrix can be used to advantage will become apparent in view of the foregoing disclosure. Furthermore, it is envisioned that more economically mass producible examples of the analog switching matrices, and controllers therefor, will be developed in accordance with the spirit of the invention. It is believed that so far as analog telephony will remain prevalent within the typical telephone local area networks for a very long time to come, the principles herein exemplified and claimed will be manifest in many examples of new telephone systems as well as being retrofitted into a number of existing TDM PCM telephone central offices.

What is claimed is:

1. A telecommunications switching system including, a plurality of line interface circuits for coupling communications signals between channels organized in periodically reoccurring frames in a time division multiplex (TDM) switching network and telephone lines served by the telecommunications switching system, and a call control means being responsive to signalling received from the telephone lines in association with telephone calls, for directing the operations of the time division switching network to provide communications paths via the TDM channels between ones of the telephone lines, the telecommunications switching system comprising:

means for coupling each of the line interface circuits with a predetermined one of the channels in the TDM switching network;

detector means being connected to each telephone line of a plurality of the telephone lines for detecting a transition from an ON HOOK state to an OFF HOOK state;

analog switch means being for connecting each of the telephone lines in the plurality of telephone lines to any one of a limited number of not more than a predetermined half of the line interface circuits, in the plurality of line interface circuits;

control means being responsive to a detected transition to the OFF HOOK state, in the state of any one of the plurality of telephone lines, for causing the analog switch means to switch said any one of the plurality of telephone lines to an idle one of said predetermined line interface circuits, and, in an event of none of said predetermined line interface circuits being idle, the control means being responsive to the detected transition to the OFF HOOK state, for causing the analog switch means to re-switch another telephone line, already having been connected to one of said predetermined line interface circuits, to an alternate line interface circuit not within said limited number of line interface circuits and to disconnect said another telephone line from the one of said predetermined line interface circuits, and thereafter for causing the analog switch means to connect said any one of the plurality of telephone lines with the one of said predetermined line interface circuits.

2. A line interface system for coupling a plurality of n telephone line appearances to a lesser plurality of m communications paths in a telephone system, the line interface system comprising:

m line interface circuits, each of which provides signal translation between an operating signal format of a preassigned one of the m communications paths in the telephone system and a one of the telephone line appearances;

a sensing circuit means connected with each of the telephone is line appearances, each sensing circuit means for sensing ON HOOK and OFF HOOK states of a telephone line;

analog switch means including n groups of z crosspoints each of the z crosspoints in a group being operable to connect and disconnect a one of the n telephone line appearances at a corresponding one of the m line interface circuits, the n groups of z crosspoints being so arranged that each of the m line interface circuits is connectable with more than z of the line appearances, and control means for directing switching operations of the analog switch means to connect a telephone line appearance with a corresponding idle one of the line interface circuits via the associated crosspoint, in response to a transition to an OFF HOOK state having been sensed by the sensing circuit means.

3. A line interface system as defined in claim 2 wherein the line interface circuits each include means for supplying energizing current to a telephone line appearance and means for coupling signalling from the telephone line appearance to the telephone system, and the sensing circuit means each include switch means being responsive to the control means for isolating the sensing circuit means from the telephone line appearance.

4. A line interface system as defined in claim 2 wherein the control means is responsive to a sensing of a newly OFF HOOK state, at one of the line appearances, being coincident with the line interface circuits connected with other OFF HOOK line appearances, for transferring one of the OFF HOOK line appearances to an idle one of its associated z line interface circuits, to provide an idle line interface circuit for connection with the line appearance of the newly OFF HOOK state.

5. A line interface system as defined in claim 2 wherein the control means is responsive to z corresponding line interface circuits being busy coincident with a sensing of a transition to the OFF HOOK state, for finding another of the OFF HOOK line appearances for which there is another line interface circuit which is idle, for connecting the another of the OFF HOOK line appearances to the another line interface circuit and thereafter for disconnecting the another of the OFF HOOK line appearances from the line interface circuit to which the another of the OFF HOOK line appearances was previously connected.

6. A line interface system as defined in claim 3 wherein the control means is responsive to all the corresponding z line interface circuits being busy coincident with a sensing of a transition to the OFF HOOK state, by transferring another of the line appearances from one of said line interface circuits to a previously idle line interface circuit, to provide an idle line interface circuit.

7. A line interface system as defined in claim 3 wherein the control means is responsive to all corresponding z line interface circuits being busy coincident with a sensing of a transition to the OFF HOOK state, by finding another of the OFF HOOK line appearances for which there is an alternate line interface circuit which is idle, connecting the another of the OFF HOOK line appearances to the alternate line interface circuit and thereafter disconnecting the another of the OFF HOOK line appearances from the line interface circuit to which the another of the OFF HOOK line appearances was previously connected.

8. A line interface system as defined in claim 3 wherein the control means responsive to all the corresponding z line interface circuits being busy coincident with a sensing of a transition to the OFF HOOK state, and there being no other of the line appearances for which there is an alternate line interface circuit which is idle, by ignoring the transition until after at least one disconnect instruction has been received from the telephone system and executed by the control means.

9. A line interface system for coupling a plurality of n telephone line appearances having connection means for connecting to telephone lines, to a lesser plurality of communications paths in a telephone system, the line interface system comprising:
   line interface circuits, each for coupling signals between a preassigned one of the communications paths in the telephone system and a one of the plurality of n telephone line appearances;
   a circuit means connected with each of the telephone line appearances, each circuit means for sensing ON HOOK and OFF HOOK states;
   an analog switch means for selectively connecting any one of the plurality of n telephone line appearances to any one of a predetermined plurality z of the line interface circuits wherein said predetermined plurality z is limited to a number of from two to five.

10. A line interface system as defined in claim 9 wherein each of the line interface circuits includes means for supplying energizing current to a telephone line and means for transmitting the states of the telephone line to a controller in the telephone system.

11. A line interface system as defined in claim 9 wherein each of the circuit means for sensing the ON HOOK and OFF HOOK states includes, resistive elements for connecting energizing current from a power source to the telephone line appearance, and means for generating a signal indicative of an OFF HOOK state in response to at least a predetermined amount of direct current flow via one of the resistive elements.

12. A line interface system as defined in claim 11 wherein the circuit means for generating a signal indicative of the OFF HOOK state includes an optoelectric device.

13. A line interface system as defined in claim 10 wherein each of the circuit means comprises, resistive elements for connecting energizing current from a power source to the telephone line, and means for generating a signal indicative of the OFF HOOK state in response to at least a predetermined amount of direct current flow via one of the resistive elements and an optoelectric device being connected in series therewith.

14. A line interface system as defined in claim 10 wherein each of the circuit means includes, a relay having a relay contact and tip and ring coils for supplying the energizing current and for operating the relay contact in response to the energizing current exceeding a predetermined amount.

15. A method for coupling a plurality of up to m telephone calls from among n telephone line appearances, to a plurality of m communications paths in a telephone system, comprising the steps of:
   providing for connecting between each of the n telephone line appearances and less than all the m communications paths, such that any one of the m communications paths is for connection with any of at least a plurality of the n telephone line appearances; and
   in an event of a service request occurring at a one of the n telephone line appearances for which all of the communications paths are already engaged by others of the n telephone line appearances, and in the event that there is another communications path available to one of said others of the n telephone line appearances, transferring the one of said others of the n telephone line appearances to be engaged with the another communications path, and thereafter
   engaging said one of the n telephone line appearances with a communications path from which the one of said others of the n telephone line appearances is transferred.

16. A method as defined in claim 15 wherein the step of transferring the one of said others of the n telephone line appearances to be engaged with the another communications path comprises the sequential steps of:
   engaging the another communications path with the one of said others of the n telephone line appearances and disengaging the prior connected Communications path to make the prior connected communications path idle.

17. A method for coupling a plurality of up to m telephone calls from among n telephone lines, to a plurality of m communications paths in a telephone system, comprising the steps of:
   providing for connection between each of the n telephone lines and less than all the m communications paths, such that any one of the m communications paths is available for connection with any of at least a plurality of the n telephone lines;
   maintaining a busy idle map indicative of OFF HOOK ones of the n telephone lines being coupled with respective ones of the m communications paths, ON HOOK ones of the n telephone lines and idle ones of the m communications paths;
   in an event of a service request occurring at one of the n telephone line appearances for which all of the communications paths are already coupled with others of the n telephone line appearances, searching the busy idle map for an alternate communication path, and in the event that there is an alternate communications path available to one of said others of the n telephone line appearances;
      (i) coupling the alternate communications path with the one of said others of the n telephone lines and thereafter uncoupling the prior connected communications path to make the prior connected communications path idle, and thereafter
      (ii) coupling said one of the n telephone line appearances with the idled communications path.

18. A method of setting up connections between ones of a plurality of n telephone line terminals and some ones of a lesser plurality of m line interface circuits in a telephone system having a call controller for directing operations of a switching network for providing communications paths between various interface circuits including the m line interface circuits, the method comprising the steps of:
   sensing an OFF HOOK state at one of the n telephone line terminals, and connecting the one of the n telephone line terminals to an idle line interface circuit in a predetermined group of from as little as 2 and up to and including as many as m/y of the m line interface circuits, where y is a number of at least 2, and in an event that not one of the line interface circuits in the predetermined group is idle;
   finding a line interface circuit outside of the predetermined group to which another one of the n telephone line terminals having previously transited to the OFF HOOK state and having previously been connected to a line interface circuit within the predetermined group, may be switched;

signalling a call transfer requirement to the call controller, and in response to a confirmation from the call controller, firstly connecting said another one of the n telephone line terminals to the found line interface circuit, secondly disconnecting said another one of the n telephone line terminals from the line interface circuit to which it was previously connected to make the line interface circuit idle, and thirdly connecting the one telephone line terminal to the idled line interface circuit.

19. A method for providing interconnections between ones of a plurality of n telephone lines, each having a line current detector connected thereto, and a lesser plurality of m line interface circuits in a telephone system, via switch paths between each of the n telephone lines and a plurality of X line interface circuits being not more than half of the m line interface circuits, comprising the steps of:

a) detecting if a transition to an OFF HOOK state of one of the n telephone lines has occurred via a one of the line current detectors;

b) determining if at least one of the X line interface circuits is idle and available for connection to the one of the n telephone lines via one of the switch paths;

c) responsive to a) and b) being affirmative, connecting the one telephone line via the switch path to the idle line interface circuit, disconnecting the one of the line current detectors, and signalling indication of the connected line interface circuit and the one telephone line to the telephone system; otherwise d) responsive to a) being affirmative and b) being negative, identifying OFF HOOK ones of the n telephone lines with at least one switch path in common with one of the switch paths associated with the one of the n telephone lines and having another switch path to an idle one of the m line interface circuits;

e) signal a requirement to the telephone system for a one of the identified OFF HOOK telephone lines to be coupled via the another switch path;

f) responsive to a signal from the telephone system, connecting the one identified OFF HOOK telephone line to the idle one of the m line interface circuits, and idling the line interface circuit to which the OFF HOOK telephone line was previously connected by disconnecting the OFF HOOK telephone line therefrom and thereafter connecting the one of the n telephone lines via the switch path to the idle line interface circuit, disconnecting the line current detector; and signalling indication of the connected line interface circuit and the one of the n telephone lines to the telephone system.

20. A telecommunications switching system as defined in claim 1 wherein the analog switch means comprises semiconductor switch circuits each being responsive to the control means to be in either of a conductive state and a nonconductive state, and wherein the control means is operative for causing the analog switch means to re-switch said another telephone line within a period of less than one of the frame occurrences.

21. A telecommunications switching system as defined in claim 1 wherein the analog switch means comprises relays and associated relay contacts each relay being responsive to the control means to be in either of an operated state or a released state such that the corresponding contact is in either a closed state or in an open state, and wherein the control means is operative for causing the analog switch means to re-switch said another telephone line by operating a one of the relays with contacts in series between said alternate line interface circuit and said another telephone line and thereafter releasing the one of the relays having contacts in series with said another telephone line, and subsequently operating a one of the relays with contacts in series with said one telephone line and the idle line interface circuit.

* * * * *